Aug. 4, 1942. M. G. HORWITZ 2,291,717
POCKET MOTION PICTURE DEVICE
Filed Jan. 3, 1941
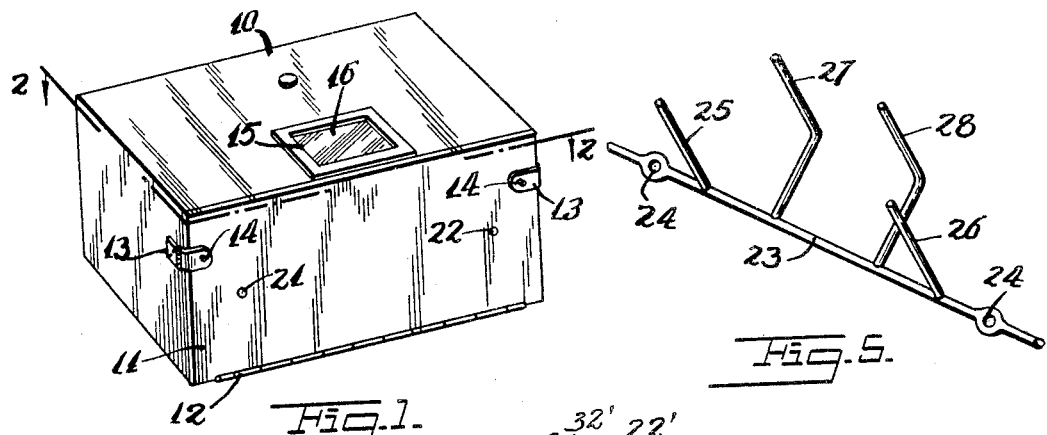
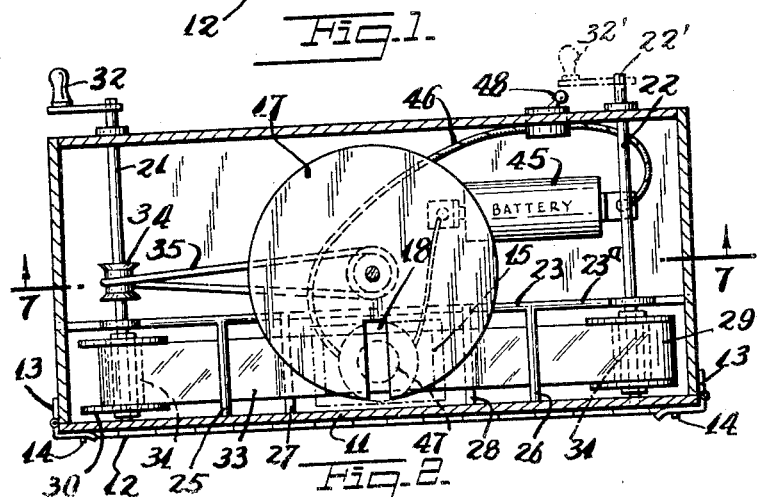
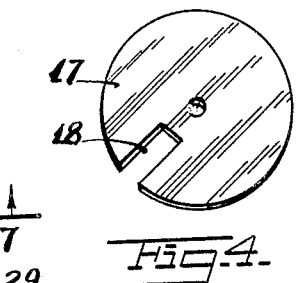
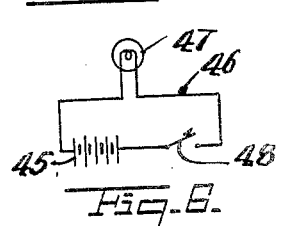
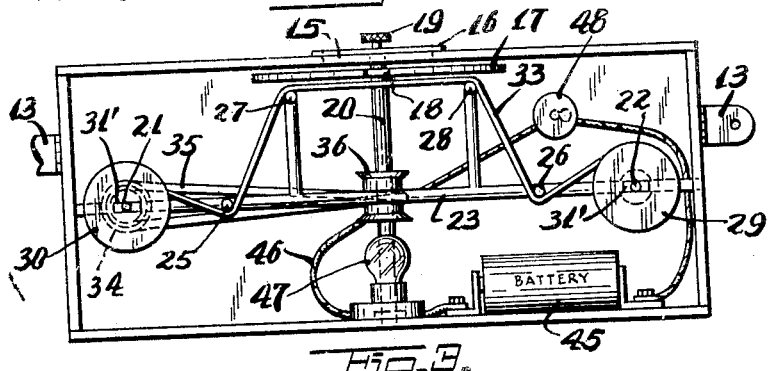
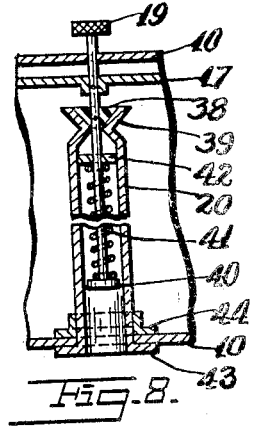
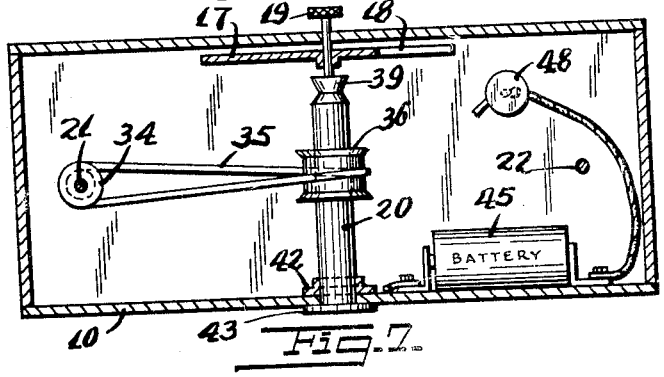
INVENTOR
*Manuel G. Horwitz*
BY
ATTORNEY Patented Aug. 4, 1942

2,291,717

UNITED STATES PATENT OFFICE 2,291,717

POCKET MOTION PICTURE DEVICE

Manuel G. Horwitz, Bronx, N. Y.

Application January 3, 1941, Serial No. 372,982

6 Claims. (Cl. 88—17)

This invention relates to new and useful improvements in a pocket motion picture device.

More specifically, the invention contemplates the construction of a device as mentioned which is so small that it may be readily carried around in one's pocket.

Still further the invention proposes the construction of a motion picture device as mentioned which is characterized by a casing having an opening in one side, and a disc rotatively mounted beneath said opening and having a slot which scans across said opening when said disc rotates. It is proposed to provide means within the casing for supporting a web of developed or printed motion picture films which may be of Celluloid, composition or of a continuous paper strip proposed to synchronize the rotating disc and means for moving the film in a certain way. More specifically, means is proposed for varying the relative position of the slot and a frame of the film to accomplish the synchronization mentioned.

Still further the invention proposes to provide a source of light within the casing adapted to shine through or upon the web of film and the window opening for projecting or viewing the moving pictures.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of a motion picture device constructed in accordance with this invention.

Fig. 2 is a horizontal sectional view taken on the line 2—2 of Fig. 1.

Fig. 3 is an elevational view of Fig. 1 but illustrated with the front of the casing removed to expose interior parts.

Fig. 4 is a perspective view of the disc used in the device.

Fig. 5 is a perspective view of a certain frame used in the device for guiding and holding the web of film.

Fig. 6 is a schematic wiring diagram of the electric parts of the device.

Fig. 7 is a vertical sectional view taken on the line 7—7 of Fig. 2.

Fig. 8 is a fragmentary enlarged vertical sectional view of a portion of Fig. 7.

The pocket motion picture device, in accordance with this invention, includes a casing 10 of box like construction having a side wall 11 arranged in the form of a door which may be opened to give access to the interior of the casing. This door 11 is hingedly opened at one side by the hinge construction 12. The door 11 is normally held closed by hinges 13 mounted on the side walls thereof and having sections extendable across portions of the door 11 and engageable with studs 14 mounted on the door. The casing 10 is provided with an opening 15 in the top wall thereof immediately adjacent the door 11. This opening is closed with a lens 16.

A disc 17 is rotatively mounted beneath the opening 15 and is provided with a slot 18 which scans across the opening 15 when the disc 17 rotates. The disc 17 is mounted on a spindle 19 which rotatively engages through the top wall of the casing 10. The spindle 19 is connected with a tubular shaft 20 rotatively mounted upon the bottom wall of the casing 10.

Means is arranged within the casing for supporting a web of motion picture film across said opening 15. This means includes a pair of horizontal shafts 21 and 22 rotatively mounted between the back wall of the casing 10 and the door wall 11 thereof. A support frame 23 is mounted across the shafts 21 and 22. This support frame has a rod portion 23ᵃ with openings 24 adapted to slide upon the shafts 21 and 22. A pair of fingers 25 and 26 project from the rod portion 23ᵃ forwards. Another pair of L-shaped fingers 27 and 28 project from the rod portion 23 upwards and forwards.

A roll of film 29 is mounted on one of the shafts, and is threaded across the portions 26, 27 and 25 as illustrated in Fig. 3 and engages upon a rewind roll 30 mounted on the other shaft. The shafts 21 and 22 have small blade portions 31, and the spools of the rolls 29 and 30 have elongated openings 31' for receiving the blade portions 31. The arrangement is such that the spools may be slipped off frontwards when the door 11 is open. The front ends of the shafts 21 and 22 are rotatively supported by engaging into receiving openings formed in the front wall door 11 as illustrated in Fig. 1. The shaft 21 has a projecting end provided with a handle 32 by which it may be turned. This handle is removable and may be placed on the square end 22' of shaft 22 as shown at 32', to reverse the motion of the film 33.

Synchronizing means is provided for rotating the disc 17 and moving the film 33 which is engaged on the support frame 23. This synchronized means includes a wheel 34 mounted on the shaft 21 and engaged by a drive element 35 engaging a wheel 36 mounted on the tubular shaft 20. When the handle 32 is turned for drawing the film 37 on the rewind spool 30, the motion will be transmitted simultaneously to rotate the tubular shaft 20 which indirectly rotates the disc 17.

Means is provided for varying the relative position of the slot 18 and a frame of the film 33 in relation to the opening 15. This means includes a friction element 38 fixedly mounted on the spindle 19, and of frusto-conical shape and normally engaging a frusto-conical shaped socket 39 formed on an end of the tubular shaft 20. The spindle 19 extends into the tubular shaft 20. Its inner end is provided with a head 40. An expansion spring 41 is coaxially mounted on the spindle 19 and acts against the head 40 and a washer 42 fixedly mounted within the tubular shaft 20. More specifically, the spring 41 urges the conical shaped friction element 38 against the socket 39 for coupling these parts together.

The tubular shaft 20 is rotatively supported by engaging through the bottom wall of the casing 10. The bottom end of the tubular shaft 20 is provided with a flange 43. A collar 44 is mounted on the tubular shaft 20 immediately adjacent the inner face of the bottom wall of the casing 10 for acting as a thrust bearing for rotatively supporting the tubular shaft 20 upon the bottom wall of the casing 10.

A battery 45 is mounted within the casing 10 and is connected in a circuit 46 which includes a lamp 47 located beneath the opening 15 or directly beneath the shutter disc 17 to illuminate the film 33. The circuit 46 is controlled by a switch 48.

The operation of the device is as follows:

The window opening 15 is slightly narrower than the length of one frame of the film 33 to nearly completely expose a frame of said film when aligned with said opening. The synchronized means for rotating the disc 17 and moving the film is so proportioned that the slot 18 of the disc 17 moves across the opening 15 while one frame moves from one side of the opening 15 to the other side in either direction. The synchronized means is also so proportioned that the disc 17 makes one complete revolution for an advance of one frame of the film 33.

When the handle 32 is rotated the disc 17 rotates and scans the opening 15 so that light from the lamp 47 may pass through the frame of the film or may be projected on a screen. The opening 18 will be disaligned with the window 15 during the motion of the film 33 to its next position in which an adjacent frame is aligned with the window 15. Then the opening 18 scans this second frame. In this way the operation continues with the opening 18 scanning each frame of the film, and the disc 17 shutting off the light during that period of time that the frames of the film pass from one position aligned with the opening 15 to its next position aligned with said opening 15.

The film may be changed by opening the door 11 and slipping the rollers 29 and 30 off the shafts 22 and 21. The film may be replaced with another motion picture film or with the same film. However, it is necessary that the parts be properly synchronized for the new position of the film 33, or new film. This synchronization is accomplished in the following manner:

One of the frames of the film 33 is aligned with the opening 15 so that it is nearly completely exposed through the opening 15 with the next adjacent frame of the film located at one side of the opening. Then the spindle 19 is pulled upwards so as to disengage the friction element 38 with the socket 39 which frees the disc 17. The disc 17 is then turned so as to set the opening 18 to the rear end of the frame exposed through the window 15. The spindle 19 is then released and the spring 41 returns it to a position in which the friction element 38 couples the spindle 19 with the hollow shaft 20. The parts are now properly synchronized.

The support frame 23 may be slipped off the shafts 21 and 22 when the door 11 is open, and the spools 29 and 30 are removed.

It is to be understood that this pocket motion picture device is very inexpensive and may be used as a toy, with any type of film made of Celluloid, composition, continuous paper strip or of any other suitable material with or without the edge perforations. The picture on the film may be printed either lengthwise or along its width as desired.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a pocket motion picture device, a casing having an opening in one side, a disc rotatively mounted beneath said opening and having a slot which scans across said opening when said disc rotates, means within said casing for supporting a web of a motion picture film across said opening, synchronized means for rotating said disc and moving said film, and means for varying the relative position of said slot and a frame of said film, said casing having a front wall hingedly supported to comprise a door, said means for supporting said web comprising a pair of shafts rotatively mounted on one of the walls of the casing and extending into openings in the door wall of said casing, and spools removably mounted on said shafts and supporting the film having said web, and a support frame removably mounted on said shafts and having finger portions for supporting said web in proper position.

2. In a pocket motion picture device, a casing having an opening in one side, a disc rotatively mounted beneath said opening and having a slot which scans across said opening when said disc rotates, means within said casing for supporting a web of a motion picture film across said opening, synchronized means for rotating said disc and moving said film, and means for varying the relative position of said slot and a frame of said film, said casing having a front wall hingedly supported to comprise a door, said means for supporting said web comprising a pair of shafts rotatively mounted on one of the walls of the casing and extending into openings in the door wall of said casing, and spools removably mounted on said shafts and supporting the film having said web, and a support frame removably mounted on said shafts and having finger portions for supporting said web in proper position, said support frame comprising a rod having openings to slip on to said shafts, and finger portions projecting from said rod.

3. In a pocket motion picture device, a casing having an opening in one side, a disc rotatively mounted beneath said opening and having a slot which scans across said opening when said disc rotates, means within said casing for supporting a web of a motion picture film across said opening, synchronized means for rotating said disc and moving said film, and means for varying the relative position of said slot and a frame of said film, comprising a spindle rotatively mounted on a wall of said casing and supporting said disc, a hollow shaft rotatively supported and receiving a portion of said spindle, resilient means for urging said spindle and hollow shaft axially relative to each other, and a friction element on one of these parts engaging a socket element on the other of these parts under said axial urging means.

4. In a pocket motion picture device, a casing having an opening in one side, a telescopic shaft including a tubular section rotatively supported on one wall of said casing and a spindle section rotatively and slidably extended through an opposite wall of said casing, said spindle section having its inner end slidably and rotatively extended into the inner end of said tubular section, a disc fixedly mounted on said spindle section and having a slot scanning said opening when said disc rotates, means for supporting a motion picture film across said opening, synchronized means for moving said film and for rotating said disc and connected with said tubular shaft section, a friction element on said spindle section engageable with a complementary socket member in said tubular section for locking said sections together for unitary rotation, and means urging said shaft sections to engage said friction element into said socket member, whereby said spindle section may be pulled outward to free said friction element from said socket member permitting said spindle section to be rotated independently of said tubular section.

5. In a pocket motion picture device, a casing having an opening in one side, a telescopic shaft including a tubular section rotatively supported on one wall of said casing and a spindle section rotatively and slidably extended through an opposite wall of said casing, said spindle section having its inner end slidably and rotatively extended into the inner end of said tubular section, a disc fixedly mounted on said spindle section and having a slot scanning said opening when said disc rotates, means for supporting a motion picture film across said opening, synchronized means for moving said film and for rotating said disc and connected with said tubular shaft section, a friction element on said spindle section engageable with a complementary socket member in said tubular section for locking said sections together for unitary rotation, and means urging said shaft sections to engage said friction element into said socket member, whereby said spindle section may be pulled outward to free said friction element from said socket member permitting said spindle section to be rotated independently of said tubular section, comprising a washer fixedly mounted within said tubular section and through which said spindle section freely passes, a head fixedly mounted on the inner end of said spindle section, and an expansion spring coaxially mounted on said spindle section and operating between said washer and head.

6. In a pocket motion picture device, a casing having an opening in one side, a telescopic shaft including a tubular section rotatively supported on one wall of said casing and a spindle section rotatively and slidably extended through an opposite wall of said casing, said spindle section having its inner end slidably and rotatively extended into the inner end of said tubular section, a disc fixedly mounted on said spindle section and having a slot scanning said opening when said disc rotates, means for supporting a motion picture film across said opening, synchronized means for moving said film and for rotating said disc and connected with said tubular shaft section, a friction element on said spindle section engageable with a complementary socket member in said tubular section for locking said sections together for unitary rotation, and means urging said shaft sections to engage said friction element into said socket member, whereby said spindle section may be pulled outward to free said friction element from said socket member permitting said spindle section to be rotated independently of said tubular section, said friction element comprising a conical shaped rubber element mounted on said spindle section and engaging a complementary shaped receiving socket forming said socket member.

MANUEL G. HORWITZ.